(12) United States Patent
West

(10) Patent No.: US 7,253,408 B2
(45) Date of Patent: Aug. 7, 2007

(54) ENVIRONMENTAL CELL FOR A SCANNING PROBE MICROSCOPE

(76) Inventor: Paul E. West, 20 Running Brook, Irvine, CA (US) 92620

( * ) Notice: Subject to any disclaimer, the term of this patent is extended or adjusted under 35 U.S.C. 154(b) by 0 days.

(21) Appl. No.: 10/931,059

(22) Filed: Aug. 31, 2004

(65) Prior Publication Data

US 2006/0043289 A1    Mar. 2, 2006

(51) Int. Cl.
   *G01N 13/16* (2006.01)
(52) U.S. Cl. .............. 250/309; 250/306; 250/607; 250/442.11; 73/105
(58) Field of Classification Search ............ None
   See application file for complete search history.

(56) References Cited

U.S. PATENT DOCUMENTS

| | | | |
|---|---|---|---|
| RE34,489 E * | 12/1993 | Hansma et al. | 250/559.23 |
| 5,291,775 A * | 3/1994 | Gamble et al. | 73/105 |
| 5,488,602 A * | 1/1996 | Yamano et al. | 369/126 |
| 5,621,210 A * | 4/1997 | Lindsay | 250/306 |
| 5,750,989 A * | 5/1998 | Lindsay et al. | 250/306 |
| 6,051,825 A * | 4/2000 | Lindsay et al. | 250/201.3 |
| 6,586,734 B2 * | 7/2003 | Knauss et al. | 250/306 |
| 2002/0162960 A1* | 11/2002 | Knauss et al. | 250/306 |
| 2004/0083799 A1* | 5/2004 | Markakis et al. | 73/105 |
| 2005/0001164 A1* | 1/2005 | Tokuda et al. | 250/309 |

* cited by examiner

*Primary Examiner*—Nikita Wells
(74) *Attorney, Agent, or Firm*—Russo & Hale LLP; William C. Milks, III

(57) ABSTRACT

An environmental cell for use with a scanning probe microscope includes a cell chamber, a probe mounted to the cell chamber, a puck selectively connected to the cell chamber, a sample holder selectively inserted in the puck, and a translation mechanism coupled to the sample holder to move the sample holder. Gasses or liquids may be introduced to the environmental cell through channels formed in either the puck, sample holder, or cell chamber.

33 Claims, 8 Drawing Sheets

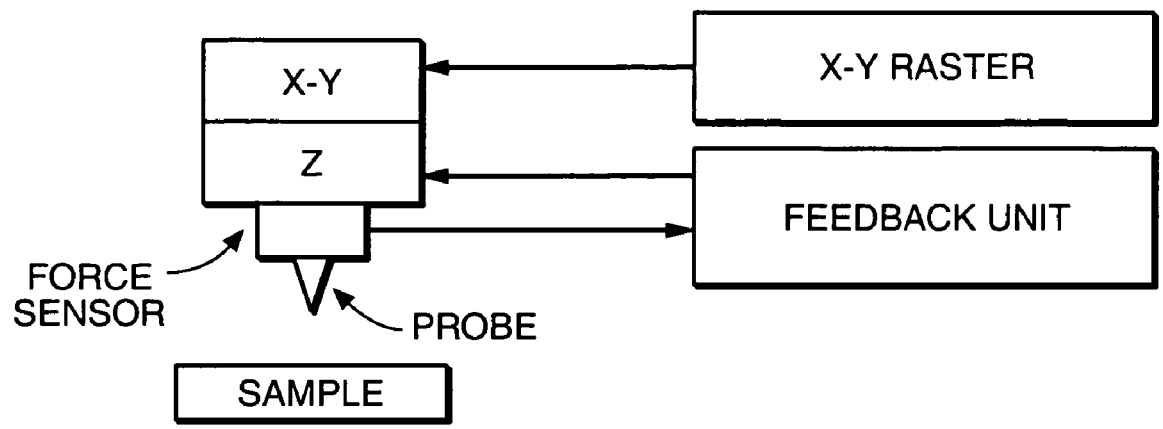
FIG._1
*(PRIOR ART)*
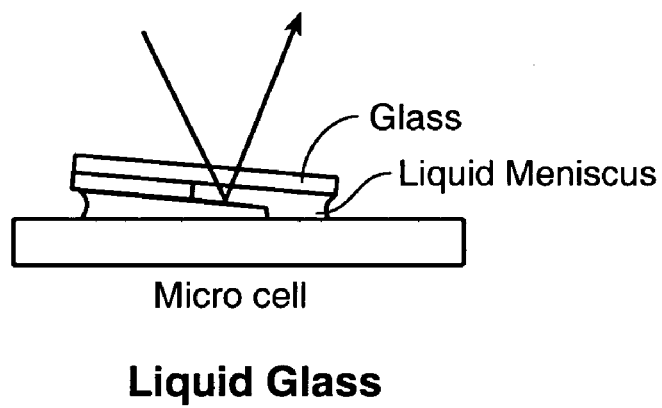
Liquid Glass
FIG._2A
*(PRIOR ART)*

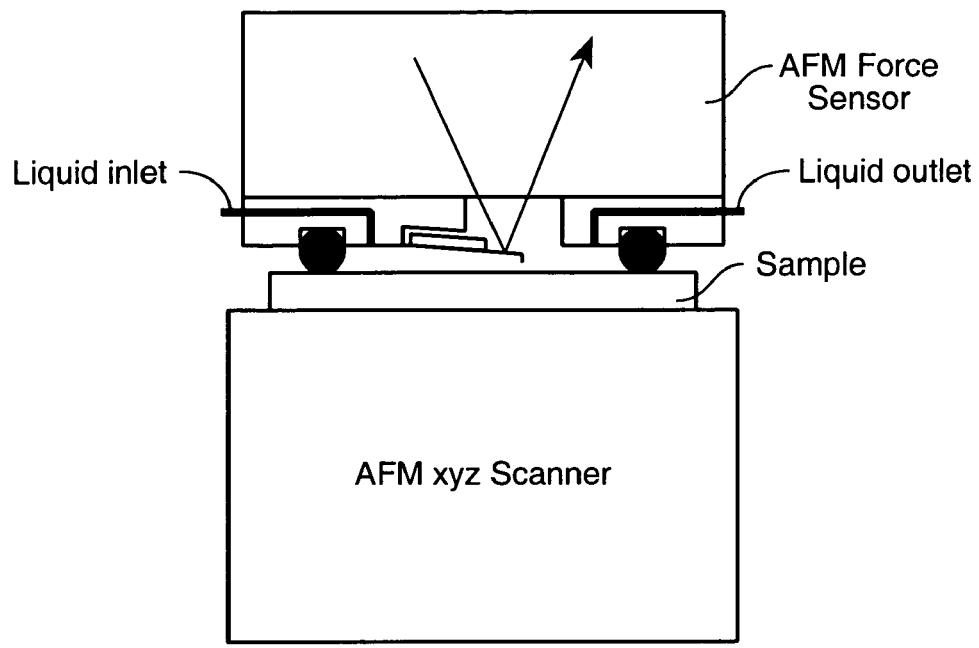
Hansma Cell
*FIG._2B* *(PRIOR ART)*
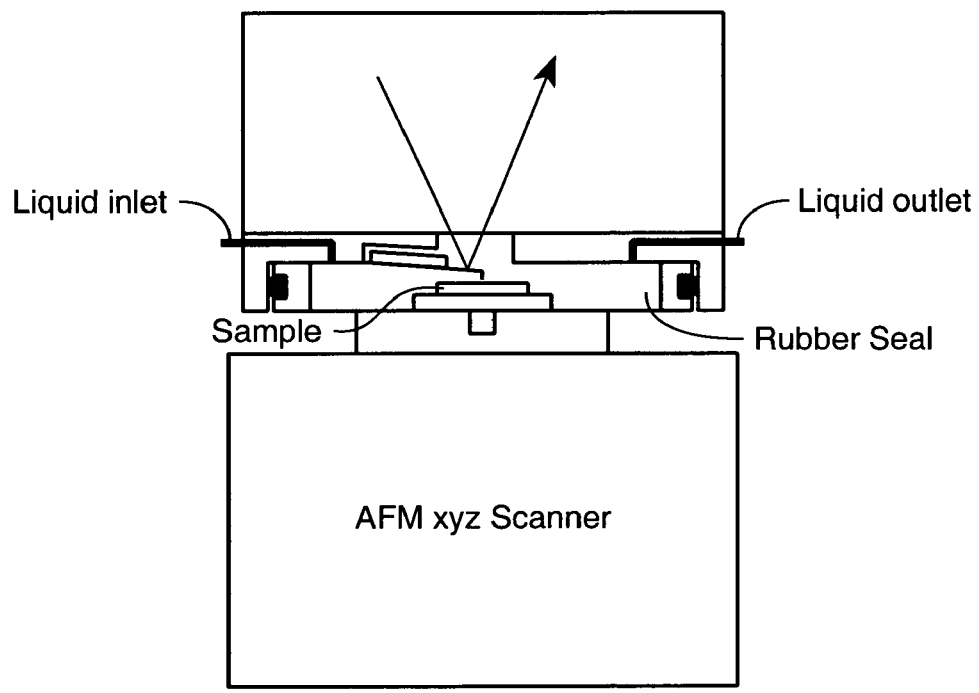
Gamble Cell
*FIG._2C* *(PRIOR ART)*

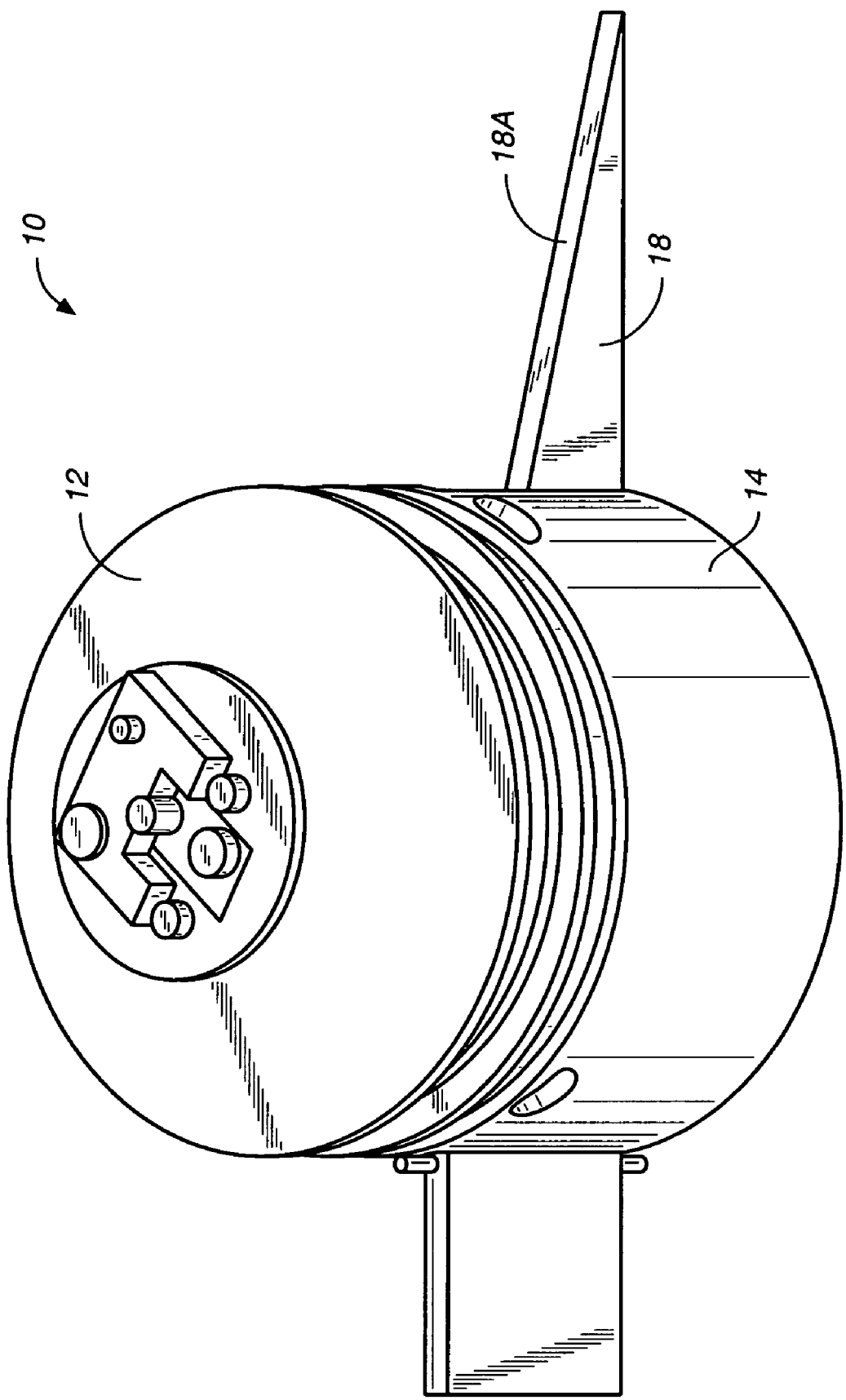
FIG._3

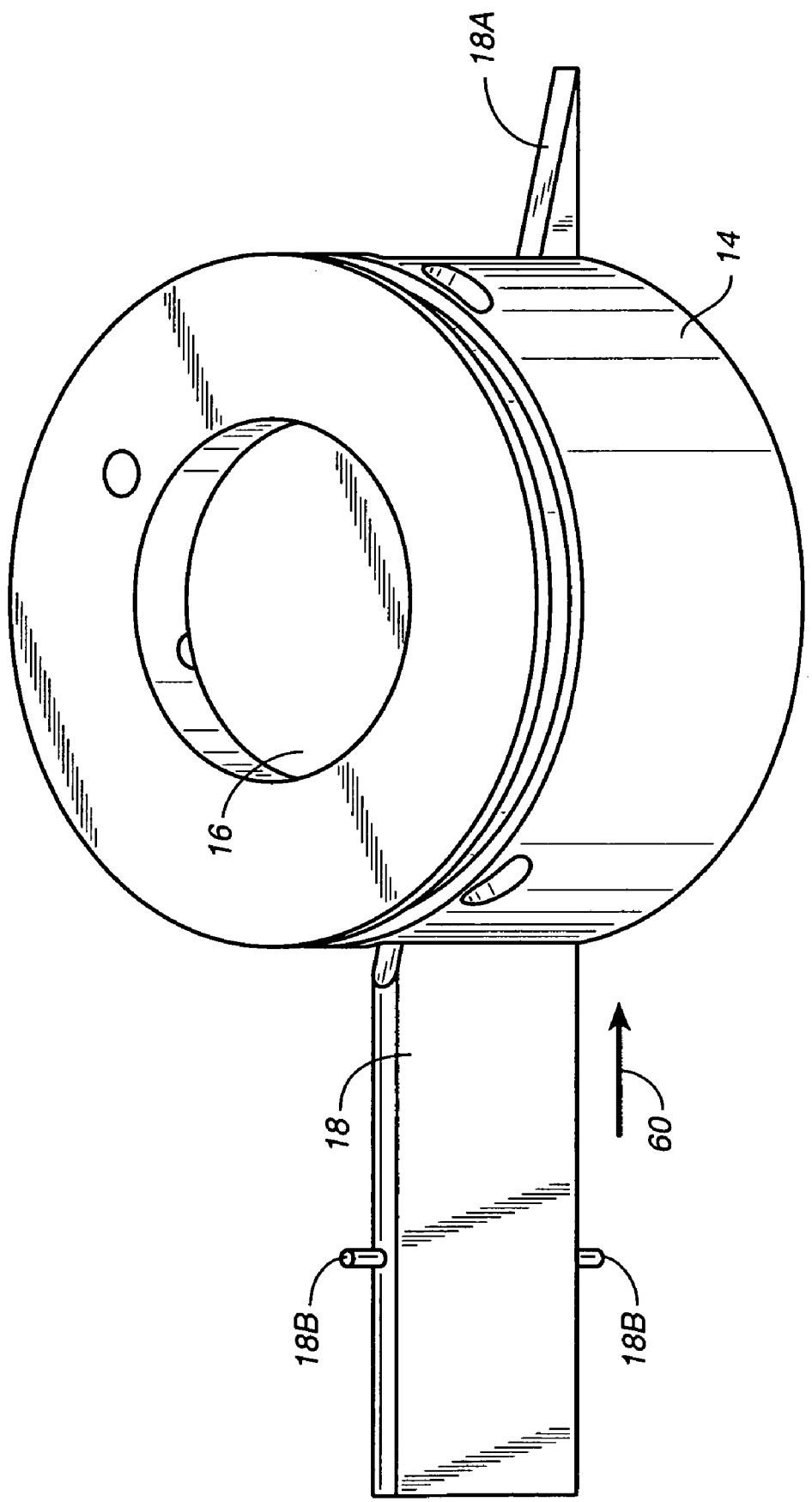
FIG._4

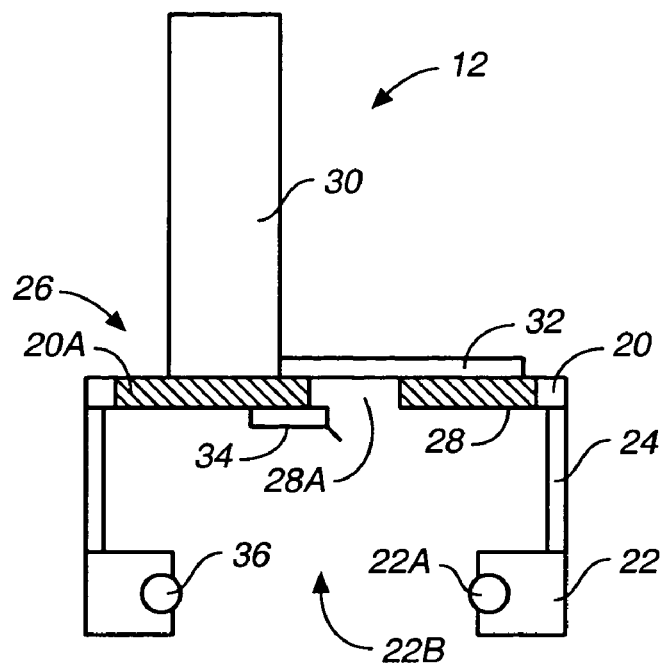
FIG._5A
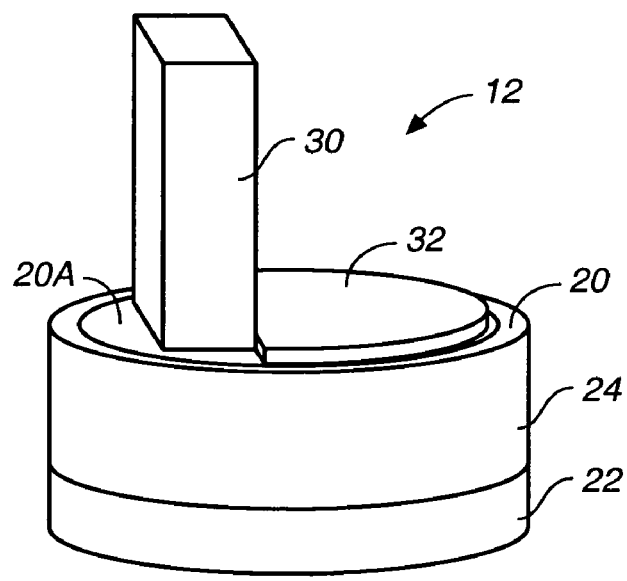
FIG._5B

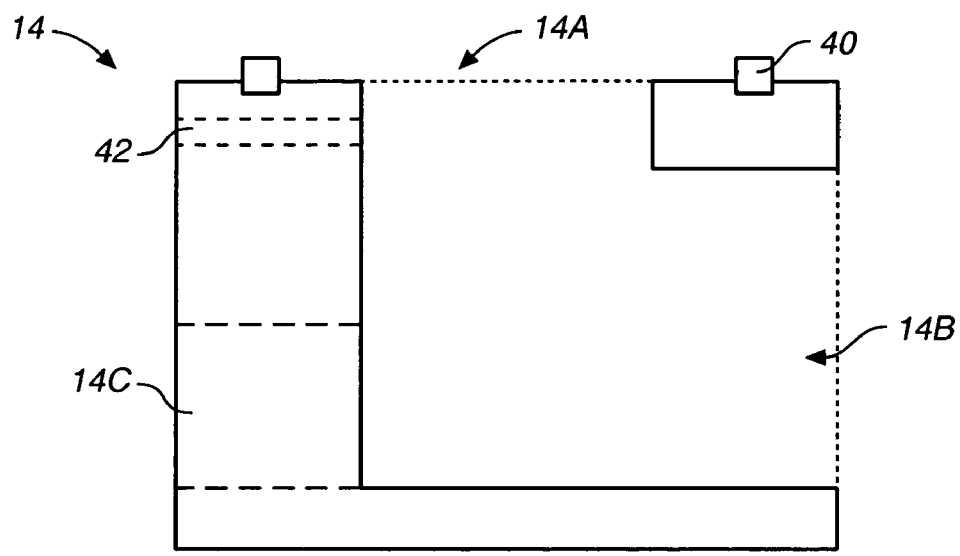
FIG._6A
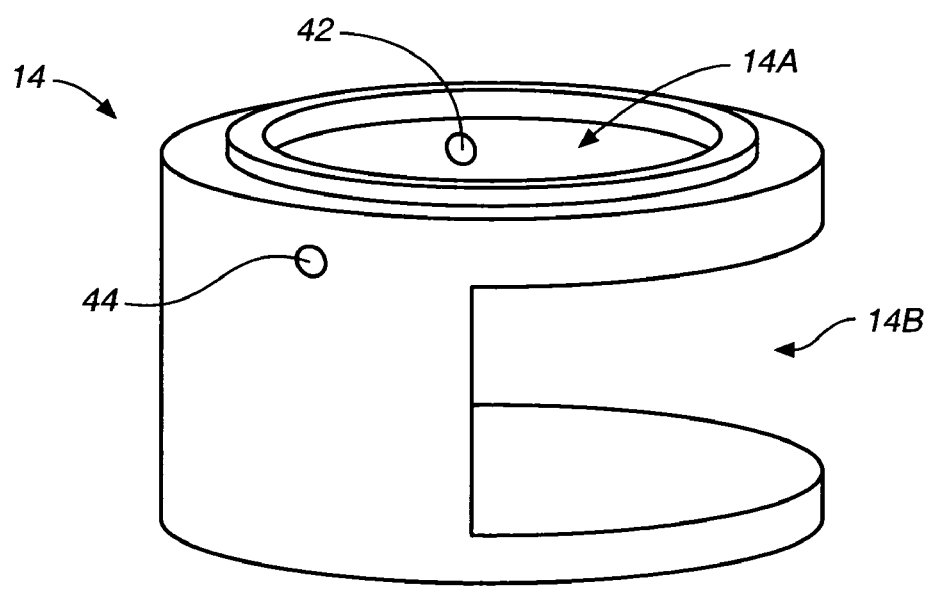
FIG._6B

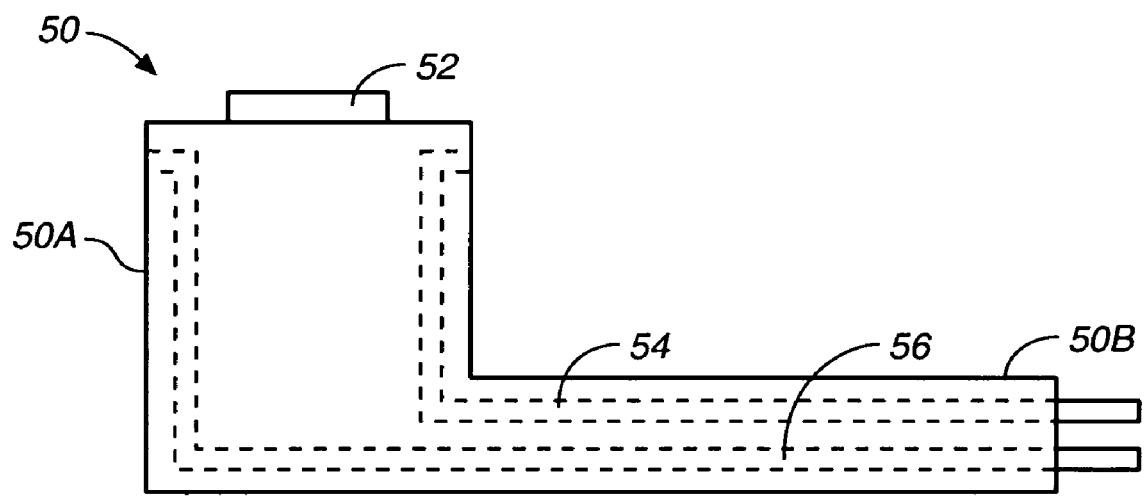
FIG._7A
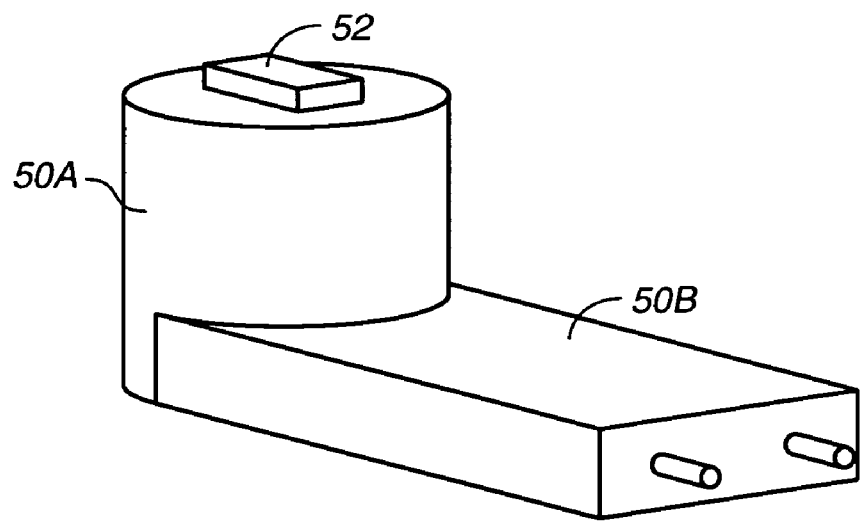
FIG._7B

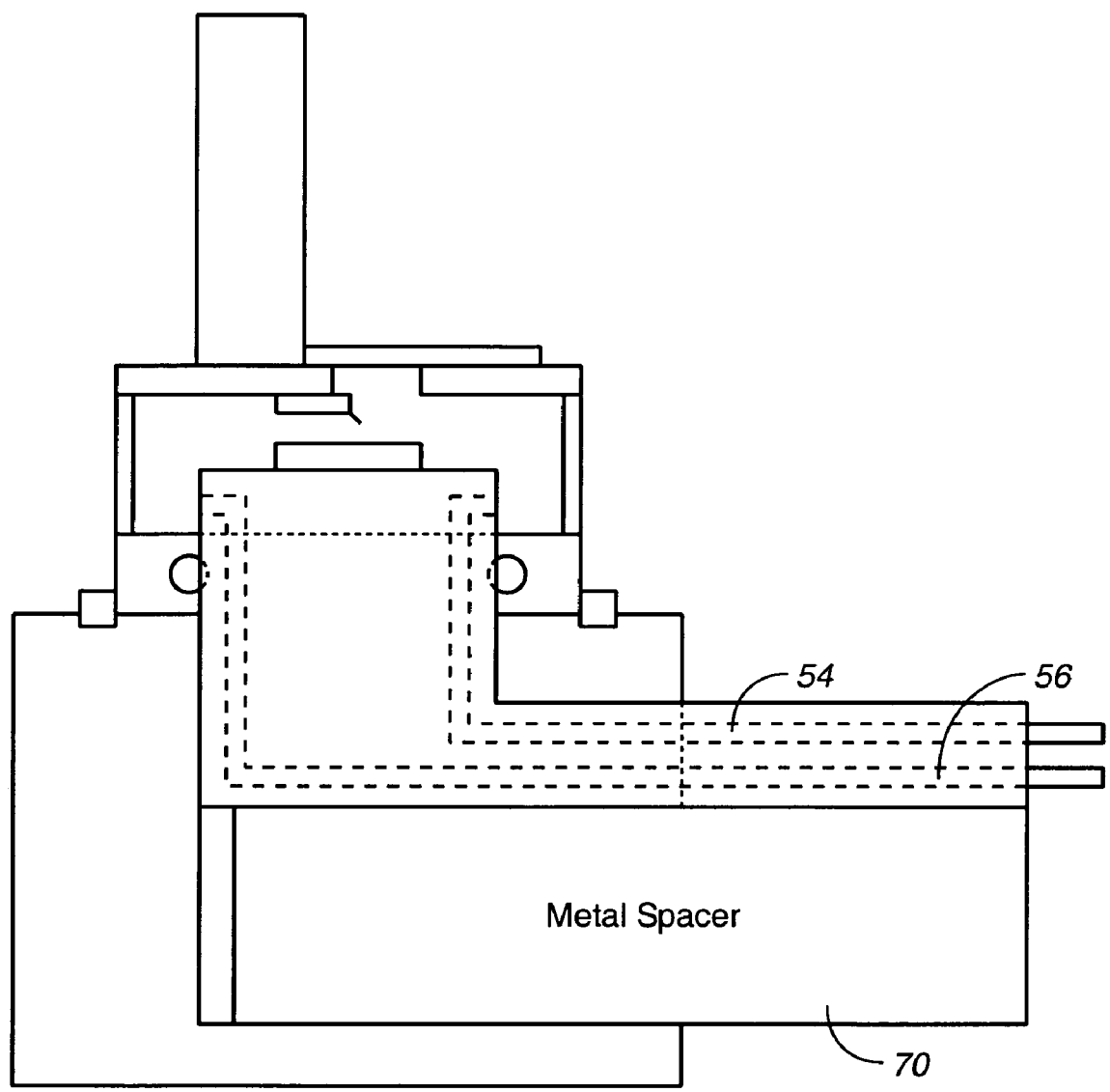
FIG._8

ENVIRONMENTAL CELL FOR A SCANNING PROBE MICROSCOPE

BACKGROUND OF THE INVENTION

1. Field of the Invention

The present invention relates generally to scanning probe microscopy and, more particularly, to an environmental cell that is used with a scanning probe microscope. In accordance with one embodiment of the present invention, an environmental cell is provided for a scanning probe microscope in which a probe comprising the scanning probe microscope is scanned and a sample being studied is held stationary.

2. Description of the Prior Art

In a scanning probe microscope (SPM), it is possible to scan a sample and hold the probe stationary. Alternatively, it is possible to scan the probe and hold the sample stationary.

In the type of SPM in which the sample is held stationary, a sharp probe is typically scanned over a surface of the sample in a raster scan motion while the probe is maintained in a predetermined relationship to the surface. A sensing system, together with a feedback circuit and electromechanical transducer, is used to maintain the predetermined relationship between the probe and surface. A three-dimensional image of the surface may then be created by displaying the motion of the probe on a display such as a computer screen. The sharper the probe of an SPM, the higher the horizontal resolution of the image will be. Scanning the probe has substantial advantages, because the sample size can be changed without unwanted effects on the feedback circuit coupled to the sensing system. FIG. 1 illustrates the primary components of a known scanning probe microscope of the type known as an atomic force microscope (AFM) having a scanned probe. In an AFM the x, y, z electromechanical transducers are disposed in an AFM "head."

There are many different types of probes and sensing systems that can be used in an SPM. For example, if the probe and sample are electrically conductive, the current flow between the probe and sample may be monitored and used to establish a predetermined distance between the probe and surface of the sample. This type of scanning probe microscope is generally known as a scanning tunneling microscope (STM). The most commonly used type of SPM is the AFM. In an AFM, the relationship between the probe and surface of the sample is established using a force sensor comprising the sensing system. The probe is raster scanned in the X-Y plane, and the Z position of the probe is controlled by the sensing system together with a feedback circuit and electromechanical transducer.

REFERENCE

1) Hansma, et al., U.S. Pat. No. RE34,489
2) Bard Paper on Electrochemistry (STM in Liquids)
3) Hansma Paper on AFM in Liquids
4) Explorer Patent (Gamble/West)
5) STM Patent of IBM
6) Veeco Product Literature
7) Molecular Imaging Product Literature Environmental cells are essential for performing SPM experiments in a controlled environment such that the probe tip and sample are free of contamination. During study of a sample having a surface exposed to ambient air, the surface of the sample and/or the probe tip may become contaminated rapidly. This surface contamination layer is typically formed and is composed of water and hydrocarbons. Depending on the local environment, the surface contamination layer can be from 1 to 100 nm thick.

In several known types of surface inspection instrumentation such as TEM, ESCA, LEEDS, and Auger spectroscopy, the local environment is controlled. For example, situating a sample in a vacuum that has no gasses can maintain the sample surface very clean. Also, glove boxes can be used to control the gasses to which a sample surface is exposed. Furthermore, a flow cell can be used to control the localized environment of the sample surface.

Additionally, it is occasionally necessary to study the surface of a sample that may react with the oxygen in ambient air. In such situations, it is also necessary to control the environment of the sample surface being studied.

Because SPMs are used for studying surfaces, they are often constructed to include controlled environmental chambers to prevent exposure of the surface of a sample under study to unwanted contamination. In fact, the first type of SPM, the STM, was originally designed to operate in an ultra-high vacuum, $<10^{-10}$ torr. Later, it was discovered that the STM could be used with the probe and sample submerged in a liquid.

With the advent of the AFM, the applications for scanning probe microscopy expanded dramatically. Because the STM had been used in controlled environments, it was logical to construct controlled environmental chambers for the AFM. As pointed out by Hansma, it was known to use an STM in a liquid and it was therefore straightforward to operate an AFM in a controlled environment such as a liquid.

Several types of devices are known for use with SPMs to maintain the probe and the sample in a controlled environment. Such devices have typically been intended for AFMs in which the sample is scanned and the probe is held stationary.

The simplest type of environmental control technique for an AFM is to submerge the probe in a liquid. For example, a "micro-cell" is known having a piece of glass above the probe to maintain the liquid localized near the surface of a sample, as shown in FIG. 2A. Because this is an open design, such an environmental control device does not allow the use of gasses. Also, the liquid being used can evaporate.

Several other known types of environmental control devices are available for AFMs. In the device developed by Hansma, et al., U.S. Pat. No. RE34,489, the device is an O-ring seal between a probe carrying module and the surface of a sample being studied, as shown in FIG. 2B. Limitations of this device include leakage when the AFM head is not correctly aligned with the surface of the sample. Additionally, the device developed by Hansma, et al., is limited to AFMs in which the sample is scanned below the probe.

Another known environmental control device, shown in FIG. 2C, has the sample enclosed in a cavity formed at the bottom by a latex element. This device does not require precision alignment between the scanner and AFM head. However, because the probe is held in a cavity above the latex, the probe can be inadvertently broken during operation. Also, this device has been limited to AFMs that scan the sample and do not scan the probe.

Environmental control devices commercially available from Veeco such as the multimode SPM, derived from the design of Hansma, is available as an option but is difficult to use and limited in capability. A second product available from Veeco is not an option for an AFM and requires a stage that is costly, and because it is not an option, cannot be used for many types of AFM applications. The environmental control device commercially available from Molecular Imaging allows for immersing the probe in a liquid in an inert environment, but is not an option and does not facilitate using a high resolution optical microscope that is essential for AFM operation.

A shortcoming of the known prior art is that there is no environmental cell, preferably available as an option or accessory, for an SPM having a scanned probe that facilitates the use of a controlled environment such as a liquid or gas without evaporation of the liquid or escape of the gas. An additional shortcoming of known environmental control devices is that the environmental control device is typically built into the scanning probe microscope and that the sample is scanned with respect to the probe. Another shortcoming is that known environmental control devices do not allow the sample or probe to be easily changed. An additional shortcoming is that some known environmental control devices do not facilitate the use of a high resolution optical microscope needed for alignment of the force sensor in an AFM and also needed to inspect the probe tip for damage. Accordingly, a problem addressed by the present invention is not only how to control the environment for a sample, but also to facilitate the use of the environmental cell in scanning probe microscopes in which the sample is mounted either below or above the probe and to facilitate changing the sample being studied or a damaged probe, as well as to facilitate the use of a high resolution optical microscope.

Consequently, there is a need for an environmental cell for providing an effectively controlled environment for a sample whose surface is being studied, and can be added to an SPM such as an AFM as an option or accessory. Moreover, there is a need for an environmental cell that allows changing the sample or probe in an SPM in which the probe is scanned and the sample is held stationary, whether the probe is disposed above or below the sample. Additionally, there is a need for an environmental cell that accommodates the use of a high resolution optical microscope to align of the force sensor in an AFM and to inspect the probe tip for damage.

The environmental cell in accordance with the various embodiments of the present invention is targeted at solving the foregoing problems by approaching the problems in a unique way to provide precise control of the environment in which the sample is studied. Furthermore, changing the sample or probe is facilitated in a scanning probe microscope having a scanned probe, and use of a high resolution optical microscope is also facilitated.

SUMMARY OF THE INVENTION

It is a general object of the present invention to provide an environmental cell that may be used as an option or accessory with a scanning probe microscope (SPM) such as an atomic force microscope (AFM) having a scanned probe.

It is also an objective of the present invention to provide an environmental cell that is substantially easier to use than previous devices, including changing the sample and replacing a damaged probe.

Additionally, it is an objective of the present invention to provide an environmental cell that accommodates the use of a high resolution optical microscope.

Accordingly, various embodiments of the present invention provide an environmental cell that is used with an SPM in which the probe is scanned and the sample is held stationary. The environmental cell in accordance with one preferred embodiment of the present invention for use with a scanning probe microscope preferably comprises: a cell chamber; a probe mounted to the cell chamber; a puck selectively connected to the cell chamber; a sample holder selectively inserted in the puck; and a translation mechanism coupled to the sample holder to move the sample holder. Gasses or liquids may be introduced to the environmental cell through channels formed in either the puck, sample holder, or cell chamber.

The embodiments of the environmental cell in accordance with the present invention have various advantages. For example, the environmental cell in accordance with the present invention facilitates simplified exchange of samples and probes. Additionally, in the environmental cell in accordance with the present invention, only the sample and probe are maintained under environmental control.

The foregoing and other objects, features, and advantages of the present invention will become more readily apparent from the following detailed description of the preferred embodiments, which proceeds with reference to the accompanying drawings.

BRIEF DESCRIPTION OF THE DRAWINGS

FIG. 1 illustrates the primary components of a known scanning probe microscope, more particularly, an atomic force microscope;

FIG. 2A illustrates a known "micro-cell" having a piece of glass above the probe to maintain a liquid localized near the surface of a sample;

FIG. 2B illustrates a known liquid cell formed with an O-ring seal between a probe carrying module and the surface of a sample being studied;

FIG. 2C illustrates another known liquid cell having a sample enclosed in a cavity formed at the bottom by a latex element;

FIG. 3 is an isometric view of one embodiment of an environmental cell in accordance with the present invention that facilitates control of the environment for a sample and enables changing samples and as well as the probe;

FIG. 4 is an isometric view of a sample holder, puck, and translation mechanism comprising the embodiment of the environmental cell shown in FIG. 3;

FIG. 5, comprising the cross-sectional diagram of FIG. 5A and the isometric view of FIG. 5B, illustrates a cell chamber comprising the embodiment of the environmental cell shown in FIG. 3;

FIG. 6, comprising the cross-sectional diagram of FIG. 6A and the isometric view of FIG. 6B, illustrates a sample holder comprising the embodiment of the environmental cell shown in FIGS. 3 and 4;

FIG. 7, comprising the cross-sectional diagram of FIG. 7A and the isometric view of FIG. 7B, illustrates an alternative sample holder having internal fluid inlet and outlet channels; and FIG. 8 is a schematic diagram of an alternative embodiment of the environmental cell in accordance with the present invention incorporating the sample holder shown in FIG. 7.

DETAILED DESCRIPTION OF THE PREFERRED EMBODIMENTS

The following definitions are adopted for the purpose of the following description of the embodiments of the environmental cell in accordance with the present invention for a scanning probe microscope preferably having a scanned probe.

"SPM" means scanning probe microscope. For example, SPM includes, but is not limited to, scanning tunneling microscopes, atomic force microscopes, and near-field optical scanning microscopes.

"AFM" means atomic force microscope. For example, the atomic force microscope may be a Model NanoR available from Pacific Nanotechnology, Inc. located in Santa Clara, Calif.

"x" and "X," "y" and "Y," and "z" and "Z" refer to the orthogonal directions or axes of the Cartesian coordinate system for facilitating a description of the structure and operation of the environmental cell in accordance with the present invention. Other coordinate systems, such as R, Theta, are deemed equivalents.

"x, y, z" refers to fine adjustment of the position of a probe.

"Electromechanical transducer" includes piezoelectric ceramics, rotary and linear motors, and all devices that convert electrical energy into mechanical energy.

The principles underlying the environmental cell in accordance with various embodiments of the present invention will now be described in conjunction with FIGS. 3-8. In accordance with the various embodiments of the present invention, controlling the environment of a sample and probe of an SPM is achieved by a structure that also facilitates changing a sample or damaged probe. Referring to FIGS. 3-8, embodiments for an environmental cell that utilizes the principles of the present invention are shown.

FIGS. 3 and 4 illustrate the elements of an environmental cell 10 in accordance with a preferred embodiment of the present invention. The environmental cell 10 comprises four main elements. The four main elements are a cell chamber 12, a puck 14, a sample holder 16, and a translation mechanism 18.

Considered in more detail, as shown in FIGS. 3 and 5, the cell chamber 12 comprises a first support ring 20, a second support ring 22, and a bellows 24 that interconnects the first and second support rings and forms a sealed coupling between the first and second support rings. The materials used to fabricate the environmental cell 10 must be inert with respect to the gasses or liquids to be used in the environmental cell. The first support ring 20 may be constructed from metal such as stainless steel or a plastic material such as polyethylene. The second support ring 22 may also be constructed from metal such as stainless steel or a plastic material such as polyethylene. The bellows 24 is preferably constructed from a plastic material such as polyethylene. In a preferred embodiment, the first support ring 20, bellows 24, and second support ring 22 may be an integral molded element constructed from a plastic material such as polyethylene.

As shown in FIG. 5, an aperture 20A is provided in the first support ring 20. A probe module 26 is secured within the aperture 20A.

The probe module 26 comprises a metal disk 28 preferably constructed from ferromagnetic material attached to a z electromechanical transducer 30 such as a piezoelectric ceramic. The cell chamber 12 attaches directly to the z electromechanical transducer 30. The metal disk 28 may have threaded holes to enable the assembled environmental cell 10 to be screwed onto the head of an AFM, for example, using mounting screws.

As shown in FIG. 5, the metal disk 28 has an aperture 28A. The aperture 28A is covered by a piece of glass or other transparent element 32 mounted to an exterior surface of the metal disk 28 to form a fluid-tight seal between the metal disk and the transparent element. For example, the transparent element 32 may be adhesively bonded to the metal disk 28.

As further shown in FIG. 5, a probe 34 is selectively mounted to an interior surface of the metal disk 28. For example, the probe 34 may comprise a probe assembly having a magnet that is magnetically coupled to the metal disk 28 secured to the first support ring 20. The assembly comprising the probe 34 is mounted so that the probe is visible through the transparent material 32 and aperture 28A that provide a window to enable the probe to be viewed by a high resolution optical microscope for alignment, for example, alignment of the probe to a laser beam directed through the window onto the probe and reflected back through the window for detection by the sensing system. The transparent material 32 and aperture 28A also permit the probe 34 to be inspected for damage necessitating replacement of the probe.

Furthermore, as shown in FIG. 5, the second support ring 22 comprises an opening 22B through which the sample holder 16 enters the cell chamber 12. The opening 22B also allows access to the probe 34. Additionally, an interior wall of the second support ring 22 is provided with a circumferential groove 22A. For example, the groove 22A may be formed by molding or machining. An O-ring 36 is mounted in the groove 22A to enable forming a fluid-tight seal against the exterior wall of the sample holder 16, as will be described in more detail later.

Referring to FIGS. 3, 4, and 6, the puck 14 is preferably a cylinder constructed from metal such as stainless steel. The puck 14 has a cavity 14A in which the sample holder 16 is placed, as shown in FIG. 4. Additionally, the puck 14 may comprise a clamping mechanism 40 that mates with the cell chamber 12.

As shown in FIGS. 3, 4, and 6, the puck 14 further preferably comprises a fluid inlet channel 42 and a fluid outlet channel 44. Fluid such as water or a gas may be pumped from an external source (not shown) into the cell chamber 12 through the inlet channel 42 and then removed from the cell chamber through the outlet channel 44. The puck 14 also comprises an access channel 14B into which the sample holder 16 is inserted into the puck. Additionally, the puck 14 preferably comprises a slot 14C through which the translation mechanism 18 is slid to move the sample holder 16 so that a sample selectively mounted to the sample holder may be positioned within the cell chamber 12.

As shown in FIG. 4, the sample holder 16 preferably comprises a cylindrical solid preferably constructed from metal such as stainless steel to which a sample (not shown) is selectively mounted. The diameter of the sample holder 16 is such that the sample holder slides within the cavity 14A of the puck 14 and opening 22B of the second support ring 22 of the cell chamber 12 and enables the O-ring 36 to seal against the wall of the sample holder.

An alternative sample holder 50 is shown in FIGS. 7 and 8. The sample holder 50 comprises a cylindrical portion 50A and a rectangular portion 50B. A sample 52 is selectively mounted to the cylindrical portion 50A of the sample holder 50. As shown in FIGS. 7 and 8, the sample holder 50 further comprises a fluid inlet channel 54 and a fluid outlet channel 56. Fluid such as water or a gas may be pumped from an external source (not shown) into the cell chamber 12 through the inlet channel 54 and then removed from the cell chamber through the outlet channel 56. In the alternative embodiment shown in FIGS. 7 and 8, the puck 14 would preferably not comprise the fluid inlet channel 42 and the fluid outlet channel 44 shown in FIGS. 3, 4, and 6.

Finally, the environmental cell 10 comprises the translation mechanism 18 for forcing the sample holder 16 into position within the cell chamber 12. As shown in FIGS. 3 and 4, the translation mechanism 18 preferably comprises an inclined edge 18A. When the sample holder 16 is inserted through the access channel 14B in line with the cavity 14A and disposed on the inclined edge 18A of the translation mechanism 18, and the translation mechanism is slid in the direction of the arrow 60 shown in FIG. 4 through the slot 14C, the sample holder is moved so as to position a sample within the cell chamber 12. Preferably, one or more stops 18B are provided on the translation mechanism 18 to prevent further insertion of the translation mechanism when the sample holder 16 has been moved so that the sample is properly positioned within the cell chamber 12. Also, the sample holder 16 may comprise a complementarily inclined slit (not shown) through which the translation mechanism 18 may be inserted into the slot 14C to properly align the sample holder 16 and facilitate proper positioning of the sample within the cell chamber 12.

As shown in FIG. 8, one contemplated modification is to provide a spacer 70 constructed from metal such as stainless steel as the translation mechanism 18. The spacer 70 is more suitably adapted for incorporation into the alternative embodiment shown in FIGS. 7 and 8 in which the rectangular portion 50B of the sample holder 50 may be grasped to manipulate the sample holder into position within the cell chamber 12. The thickness of the spacer 70 determines when the sample is properly positioned within the cell chamber 12. The rectangular portion 50B provides proper alignment of the sample holder 50 within the puck 14.

The assembly of the environmental cell 10 shown in FIGS. 3-8 for operation requires the following steps: a) mount the probe 34 (if required) with the scanner removed from mechanical supports (not shown); b) position the scanner over the mechanical supports; c) place the puck 14 below the scanner; d) clamp the cell chamber 12 to the puck 14; e) slide the sample holder 16 or 50 into the cavity 14A of the puck; and f) actuate the translation mechanism 18 or 50, 70 to lift the sample holder into the cell chamber. After completing these steps, a liquid or gas may be introduced into the cell chamber 12 through the channel 42 or 54 in the sample holder 16 or 50, respectively. FIG. 3 shows the preferred embodiment of the environmental cell 10 in accordance with the preferred embodiment described in connection with FIGS. 3-6 when fully assembled. FIG. 8 shows a cross-sectional view of the alternative embodiment of the environmental cell 10 when fully assembled.

Probe exchange is performed as follows. First, the sample holder 16 or 50 is removed. Next, the puck 14 is unclamped from the cell chamber 12. Finally, a probe 34 is inserted through the opening 22B in the bottom of the cell chamber 12. If the environmental cell 10 is mounted to an SPM, the element to which the environmental cell is mounted may be inverted during probe replacement. Thus, probes may be exchanged while the scanner is inverted without removing the cell chamber 12.

Various modifications are contemplated. The sample holder 16 may be modified to include a heater or cooling element. Also, turbulence associated with the introduction of a liquid or gas into the cell chamber 12 may be reduced by mechanically shielding the inlet and outlet channels in the puck 14 (FIGS. 3-6) or sample holder 50 (FIGS. 7 and 8). Also, the flexible material comprising the cell chamber 12 can be modified such that a sample can be moved in the X-Y plane relative to the probe 34. Furthermore, the O-ring seal in the second support ring 22 of the cell chamber 12 may alternatively be placed on the sample holder 16 or 50.

Various applications can be performed using the environmental cell 10 in accordance with the various embodiments of the present invention. For example, a flow of liquids or gasses with dispersed materials may be provided while scanning a surface to evaluate the dispersed materials with an AFM. The sample and/or probe may be cleaned before scanning by flushing the cell chamber 12 with liquid that interacts with the surfaces of the sample/probe. Hydrated samples such as proteins and other materials relevant to life sciences may be imaged. Gasses may be introduced into the cell chamber 12 that can react when the probe 34 is scanned across a specific location on a surface for lithography. Another application would be the flowing of a solution of nanoparticles through the cell chamber 12 that could be used for real time, in situ, particle size analysis.

While various embodiments of the environmental cell in accordance with the present invention and various contemplated modifications have been described above, other modifications and variations will likely occur to those persons skilled in the art. For example, the fluid inlet and fluid outlet channels may be provided in the cell chamber 12 rather than in the puck 14 or sample holder 50. The foregoing description of the various embodiments of the present invention is therefore exemplary and not limited to the specific embodiments that are disclosed above. The scope of the invention can only be ascertained with reference to the appended claims and the equivalents thereof.

What is claimed is:

1. An environmental cell for use with a scanning probe microscope, comprising:
    a cell chamber comprising a first support ring, a second support ring, and a bellows interconnecting the first and second support rings and forming a sealed coupling between the first and second support rings and further comprising an opening;
    a probe mounted to the cell chamber opposite the opening of the cell chamber;
    a puck selectively coupled to the cell chamber proximate the opening of the cell chamber;
    a sample holder selectively inserted in and movable with respect to the puck through the opening of the cell chamber when the puck is coupled to the cell chamber;
    a fluid-tight seal formed between the cell chamber and the sample holder when the sample holder is moved through the opening of the cell chamber; and
    a translation mechanism coupled to the sample holder to move the sample holder.

2. The environmental cell according to claim 1 wherein the first support ring is constructed from one of a metal and a plastic material, the second support ring is constructed from one of a metal and a plastic material, and the bellows is constructed from a plastic material, the bellows being flexible so that a sample can be moved in an X-Y plane relative to the probe.

3. The environmental cell according to claim 2 wherein the first support ring, bellows, and second support ring are integrally molded from a plastic material.

4. The environmental cell according to claim 1 wherein the first support ring has an aperture and the probe is secured within the aperture.

5. The environmental cell according to claim 1 wherein the probe comprises a probe module and the probe module further comprises a metal disk constructed from ferromagnetic material attached to a z electromechanical transducer and means for coupling the metal disk to the scanning probe microscope.

6. The environmental cell according to claim 5 wherein the metal disk has an aperture and further comprising a transparent element mounted to an exterior surface of the metal disk to form a fluid-tight seal between the metal disk and the transparent element.

7. The environmental cell according to claim 6 wherein the probe is mounted so that the probe is visible through the transparent element and aperture in the metal disk that provide a window to enable the probe to be viewed by an optical microscope.

8. The environmental cell according to claim 7 wherein the scanning probe microscope is an atomic force microscope and further comprising an optical microscope for alignment of the probe to a laser beam directed through the window onto the probe and reflected back through the window for detection by a sensing system.

9. The environmental cell according to claim 7, further comprising an optical microscope for inspection of the probe for damage necessitating replacement of the probe.

10. The environmental cell according to claim 5 wherein the probe is selectively mounted to an interior surface of the metal disk.

11. The environmental cell according to claim 10 wherein the probe comprises a probe assembly and the probe assembly further comprises a magnet magnetically coupled to the metal disk.

12. The environmental cell according to claim 1 wherein the second support ring has an opening through which the sample holder enters the cell chamber and to allow access to the probe.

13. The environmental cell according to claim 1 wherein the second support ring has an interior wall provided with a circumferential groove and further comprising an 0-ring in the groove to enable forming a fluid-tight seal against an exterior wall of the sample holder.

14. The environmental cell according to claim 13 wherein the puck has a circular cavity and the sample holder comprises a cylindrical solid to which a sample is selectively mounted, the diameter of the sample holder being such that the sample holder slides within the cavity of the puck and opening of the second support ring of the cell chamber and enables the 0-ring to seal against a wall of the sample holder.

15. The environmental cell according to claim 1 wherein the puck is a cylinder having a cavity in which the sample holder is placed.

16. The environmental cell according to claim 15 wherein the puck has an access channel into which the sample holder is inserted into the puck.

17. The environmental cell according to claim 1 wherein the puck further comprises a clamping mechanism that mates with the cell chamber to selectively couple the puck to the sample chamber.

18. The environmental cell according to claim 1 wherein the puck further comprises a fluid inlet channel and a fluid outlet channel.

19. The environmental cell according to claim 1 wherein the puck has a slot through which the translation mechanism is slid to move the sample holder so that a sample selectively mounted to the sample holder is positioned within the cell chamber.

20. The environmental cell according to claim 1 wherein the cell chamber has a circular opening, the puck has a circular cavity, and the sample holder comprises a cylindrical solid to which a sample is selectively mounted, the diameter of the sample holder being such that the sample holder slides within the cavity of the puck and opening of the cell chamber.

21. The environmental cell according to claim 1 wherein the cell chamber has a circular opening, the puck has a circular cavity, and the sample holder comprises a cylindrical portion to which a sample is selectively mounted and a rectangular portion.

22. The environmental cell according to claim 21 wherein the sample holder further comprises a fluid inlet channel and a fluid outlet channel.

23. The environmental cell according to claim 1 wherein the puck has an access channel and the translation mechanism comprises a spacer having a thickness to determine when a sample is properly positioned within the cell chamber.

24. The environmental cell according to claim 1 wherein the sample holder further comprises at least one of a heater and cooling element.

25. The environmental cell according to claim 1 wherein the cell chamber further comprises a fluid inlet channel and a fluid outlet channel.

26. An environmental cell for use with a scanning probe microscope, comprising:
a cell chamber comprising an opening;
a probe mounted to the cell chamber opposite the opening of the cell chamber;
a puck selectively coupled to the cell chamber proximate the opening of the cell chamber;
a sample holder selectively inserted in and movable with respect to the puck through the opening of the cell chamber when the puck is coupled to the cell chamber;
a fluid-tight seal formed between the cell chamber and the sample holder when the sample holder is moved through the opening of the cell chamber; and
a translation mechanism coupled to the sample holder to move the sample holder;
wherein the puck has an access channel and the translation mechanism has an inclined edge contacting the sample holder and inserted into the access channel to move the sample holder into the cell chamber.

27. The environmental cell according to claim 26 wherein the puck has a slot through which the translation mechanism is inserted.

28. The environmental cell according to claim 27 wherein the sample holder comprises a complementarily inclined slit through which the translation mechanism is inserted into the slot to properly align the sample holder and facilitate proper positioning of the sample within the cell chamber.

29. The environmental cell according to claim 26 wherein the translation mechanism additionally comprises at least one stop to prevent further insertion of the translation mechanism when the sample holder has been moved so that a sample is properly positioned within the cell chamber.

30. A method for using an environmental cell with a scanning probe microscope, comprising the steps of:
providing a cell chamber comprising a first support ring, a second support ring, and a bellows interconnecting the first and second support rings and forming a sealed coupling between the first and second support rings and further comprising an opening, a probe to be mounted to the cell chamber opposite the opening of the cell chamber, a puck selectively coupled to the cell chamber proximate the opening of the cell chamber, a sample holder selectively inserted in and movable with respect to the puck through the opening of the cell chamber when the puck is connected to the cell chamber, a fluid-tight seal formed between the cell chamber and the sample holder when the sample holder is moved through the opening of the cell chamber, and a translation mechanism to be coupled to the sample holder to move the sample holder;
mounting the probe to the cell chamber;
positioning a scanner over mechanical supports comprising the scanning probe microscope;

placing the puck below the scanner;
clamping the cell chamber to the puck;
inserting the sample holder into the puck; and
activating the translation mechanism to move the sample holder into the cell chamber.

31. The method of claim 30, further comprising the step of introducing a fluid into the cell chamber.

32. The method of claim 30, further comprising the steps of:
removing the sample holder;
unclamping the puck from the cell chamber;
dismounting the probe that was previously mounted; and mounting a different probe;
thereby exchanging probes without removing the cell chamber from a scanner.

33. An environmental cell for use as an option or accessory with a scanning probe microscope having a probe, comprising:

a cell chamber selectively inserted into the scanning probe microscope, the cell chamber comprising a first support ring, a second support ring, and a bellows interconnecting the first and second support rings and forming a sealed coupling between the first and second support rings and further comprising an opening and the cell chamber being mounted to the scanning probe microscope so that the probe is opposite the opening of the cell chamber;

a sample holder selectively positioned within the opening of the cell chamber for holding a sample;

a fluid-tight seal formed between the cell chamber and the sample holder when the sample holder is moved through the opening of the cell chamber; and means for scanning the probe with respect to the sample.

* * * * *